(12) United States Patent
Xiu et al.

(10) Patent No.: US 9,525,920 B2
(45) Date of Patent: Dec. 20, 2016

(54) METHOD AND APPARATUS FOR TRACKING TRANSMISSION LEVEL OF A HOME NETWORK SIGNAL IN A BROADCAST SIGNAL RECEIVING DEVICE

(71) Applicant: THOMSON LICENSING, Issy de Moulineaux (FR)

(72) Inventors: Lincheng Xiu, Carmel, IN (US); Jeffry Holsclaw Perrin, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 178 days.

(21) Appl. No.: 14/488,713

(22) Filed: Sep. 17, 2014

(65) Prior Publication Data

US 2015/0082358 A1    Mar. 19, 2015

Related U.S. Application Data

(60) Provisional application No. 61/879,830, filed on Sep. 19, 2013.

(51) Int. Cl.

| | |
|---|---|
| *H04N 21/61* | (2011.01) |
| *H04H 40/90* | (2008.01) |
| *H04N 21/436* | (2011.01) |
| *H04N 7/10* | (2006.01) |
| *H04N 17/00* | (2006.01) |

(52) U.S. Cl.
CPC ............ *H04N 21/615* (2013.01); *H04H 40/90* (2013.01); *H04N 7/104* (2013.01); *H04N 7/106* (2013.01); *H04N 17/004* (2013.01); *H04N 21/436* (2013.01); *H04N 21/6118* (2013.01); *H04N 21/6143* (2013.01); *H04H 2201/60* (2013.01)

(58) Field of Classification Search
CPC .............. H04N 21/436; H04N 21/6118; H04N 21/6143; H04N 21/615; H04N 7/20; H04H 40/90; H04H 2201/16; H04H 2201/14; H04H 2201/60
USPC ..................................................... 725/70, 83
See application file for complete search history.

(56) References Cited

U.S. PATENT DOCUMENTS

| | | |
|---|---|---|
| 6,988,212 B1 | 1/2006 | Hamdi |
| 8,126,065 B2 | 2/2012 | Iwamura |
| 2013/0133012 A1* | 5/2013 | Ling ...................... H04N 7/106 725/68 |

(Continued)

*Primary Examiner* — John Schnurr
(74) *Attorney, Agent, or Firm* — Brian J. Dorini; Michael A. Pugel

(57) ABSTRACT

A method and apparatus for tracking the transmission power level of a home network transmission signal based on the signal level of a received broadcast signal is described. The method includes transmitting a signal at a first transmitted level used for communicating in a home network, detecting a signal level for the transmitted signal in a circuit used for receiving a broadcast signal, determining if a gain setting value for the signal level changes, and adjusting the transmitted signal level for the transmitted signal based on the determination. The apparatus includes a network circuit that transmits a signal at a first transmitted signal level, a detector that detects the transmitted signal in a circuit for receiving a broadcast signal, and a controller that determines if a signal level setting value for the signal level changes and adjusts the transmitted signal level based on the determination.

28 Claims, 4 Drawing Sheets

(56) References Cited

U.S. PATENT DOCUMENTS

2016/0020931 A1* 1/2016 Petrovic .................. H04B 1/00
375/345

* cited by examiner

METHOD AND APPARATUS FOR TRACKING TRANSMISSION LEVEL OF A HOME NETWORK SIGNAL IN A BROADCAST SIGNAL RECEIVING DEVICE

CROSS REFERENCE TO RELATED APPLICATION

This application claims priority from U.S. Provisional Application No. 61/879,830 filed Sep. 19, 2013.

TECHNICAL FIELD OF THE INVENTION

The present disclosure generally relates to devices that receive broadcast signals and also operate in home networks. More specifically, the present disclosure relates to a method and apparatus for tracking transmission level of a home network signal in a broadcast signal receiving device.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many home entertainment devices not only include the capability to communicate with other devices in a home network but also include the ability to receive and/or process available media content from a plurality of sources, including a plurality of providers. The sources and providers may include, but are not limited to, satellite service, cable service, and free to home over the air terrestrial service. The services may operate in the same or different frequency ranges and may use the same or different transmission formats or protocols. The devices for receiving the services often include, but are not limited to, set-top boxes, gateways, televisions, home computers, and the like. Further, many of these devices may include multiple interfaces for different types of externally provided services as well as different types of home networks. These devices may also include additional features internal to the device, such as storage elements, hard drives, compact disk or digital versatile disk drives, and the like.

In order to receive signals from these different services simultaneously in the device, a filtering structure, such as a multiplex filter, is often used to separate the signals. The filtering structures are particularly important if the services operate in separate frequency ranges and/or use separate transmission formats or protocols. For example, a multiplex filter allows for the reception of multiple signal transmissions, including terrestrial transmissions complying with Advance Television Systems Committee (ATSC) standard, Digital Video Broadcasting television standard (DVB-T2), or the Integrated Services Digital Broadcasting television standard (ISDBT) as well as for the reception of satellite signals. A diplex filter, a type of multiplex filter, is often comprised of a high pass filter for a first high frequency band (e.g., a satellite signal frequency band) and a low pass or band pass filter for a second lower frequency band (e.g., a terrestrial or cable broadcast frequency band).

However, a system receiving multiple signals from multiple services over a wide range of frequencies creates significant difficulties in creating a suitable diplex or multiplex filter that provides optimal performance for all services. Previous systems often did not require the additional filtering functions in the devices in order to receive certain terrestrial (e.g., ATSC, DVB-T2, or ISDBT) broadcast signals along with satellite signals on a common co-axial cable input. System operation may be further complicated by the inclusion of an interface to a wired home communication network, such as a Multimedia over Cable Alliance (MoCA) network. For example, frequency guard bands between the frequency ranges for the terrestrial and satellite services may be small and require more selectivity from the filter sections. In configurations that operate with both satellite broadcast and home communication signals, the filtering between these signals may not be sufficient enough to prevent interference to the reception of the satellite signals caused by transmission of the home network signal from the device. For instance, a typical broadcast receiving circuit uses a signal level detector and some form of a gain or signal level adjustment circuit to control the signal level for the satellite signal prior to demodulation in the receiving circuit. Insufficient frequency spacing may not allow suitable filtering for attenuating transmitted home network signal. As a result, signal energy from the transmitted home network signal may be present at the signal level detector and may affect the operation of the signal level detector, particularly at lower signal input levels for the satellite signal. The additional signal energy may cause an incorrect gain setting for the satellite signal level and a degraded performance for satellite signal reception. The problem may be further exacerbated by the type of gain control circuit that is used. Therefore, a solution that mitigates or prevents performance degradation for satellite signal reception in a device when the device is transmitting a home network signal is desirable.

SUMMARY

The present embodiments describe a method and apparatus for tracking the transmission power level of a home network transmission signal based on the signal level of a received broadcast signal. According to an aspect of the present disclosure, a method is described. The method includes transmitting a signal at a first transmitted signal level, the signal used for communicating in a home network, detecting a signal level for the transmitted signal in a circuit, the circuit used for receiving a broadcast signal, determining if a signal level setting value in the circuit changes based on the detected signal level, and adjusting the transmitted signal level for the transmitted signal based on the determination of the change of the signal level setting value.

According to another aspect of the present disclosure, an apparatus is described. The apparatus includes a network circuit that transmits a signal at a first transmitted signal level, the signal used for communicating in a home network, a detector, coupled to the network circuit, that detects the transmitted signal, the detector used in a circuit for receiving a broadcast signal, and a controller, coupled to the detector and the network circuit, that determines if a signal level setting value in the circuit changes based on the detected signal level and adjusts the transmitted signal level for the transmitted signal based on the determination of the change of the signal level setting value.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

Figure 1:
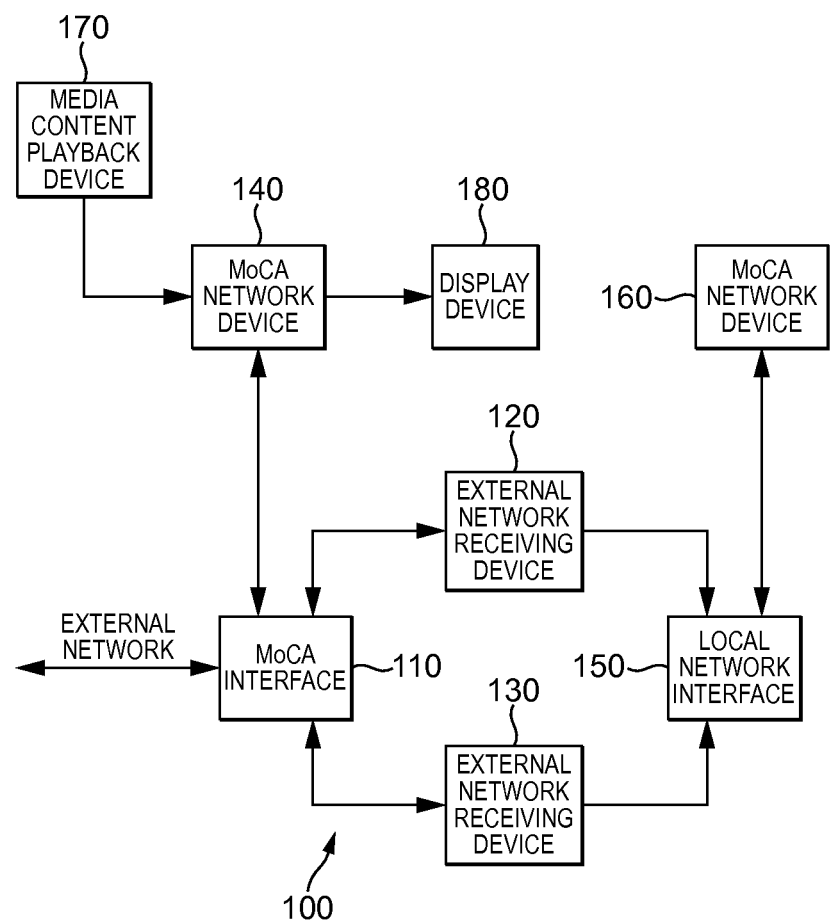
FIG. 1 is a block diagram of an exemplary signal receiving system in a home or dwelling in accordance with the present disclosure.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure addresses issues with the transmission of a network signal (e.g., a home network signal) from a device interfering with or degrading the performance of the receiving circuit used to receive a separate broadcast signal (e.g., a satellite broadcast signal) in the device. The network signal and broadcast signal are coupled through common circuitry and operate on the same communication medium, such as co-axial cable. The network signal and broadcast signal operate in different frequency ranges. The filtering in the device may not be sufficient to prevent energy in the transmitted network signal from entering the receiver circuit used for the broadcast signal.

The embodiments of the present disclosure are related to controlling or tracking the transmission level of a home network signal in a broadcast signal receiving device. The embodiments describe a method and apparatus that include a detector and controller used to adjust a stepped gain attenuator in an automatic gain control circuit as part of the receiving circuit of the device. The transmitted signal level for the home network signal provided by the device is controlled or tracked using the received signal level for the home network signal detected in the detector in the automatic gain control circuit based on the attenuator setting. The control and tracking of the transmission of the home network signal mitigates or prevents undesirable interference to the received signal during the transmission of the home network signal.

The embodiments include transmitting a signal at a first transmitted signal level, the signal used for communicating in a home network. The signal level for the transmitted signal is detected in a circuit, the circuit used for receiving a broadcast signal. The gain setting value in an attenuator in the receiver circuit is compared to a threshold to determine if a gain setting value for the signal level detected in the circuit should be changed. The transmitted signal level is adjusted if it is determined that the gain setting value detected in the circuit does not change. The final permitted signal level for the home network signal is stored for use based on the received broadcast signal level. The embodiments further include circuitry that is operable or configured to perform one of more of these functions.

Although the specific embodiments described below are directed at operation in a MoCA home network with a device receiving satellite broadcast signals, one skilled in the art may easily identify other signal operating scenarios and further easily adapt the present embodiments to those signal operating scenarios. For example, the present embodiments may be adapted to operations including a MoCA network in a device for receiving cable broadcast signals.

Turning now to FIG. 1, a block diagram of an embodiment of a system 100 for providing home entertainment media content in a home, or end user, network is shown. The media content, originating from a content provider, is provided through an external network to a Multimedia over Cable Alliance (MoCA) interface 110. The media content may be provided using any one of the standard transmission protocols and standards for content delivery (e.g., Advanced Television Systems Committee (ATSC) A/53, digital video broadcast (DVB)-Cable (DVB-C), DVB-Satellite (DVB-S), or DVB-Terrestrial (DVB-T)). MoCA interface 110 is connected to external network receiving device 120, external network receiving device 130, and MoCA network device 140. Both external network receiving device 120 and external network receiving device 130 connect to local network interface 150. Local network interface 150 connects to local network device 160. Media content playback device 170 connects to MoCA network device 140. MoCA network device 140 connects to display device 180. The components shown in system 100 comprise a home network configured to provide media content to multiple locations within the home using one or more home communication networks.

A signal containing media content (e.g., audio, video, and/or data) from the external network is provided over a physical media, such as co-axial cable. The external network interfaces to MoCA interface 110. MoCA interface 110 provides a routing mechanism for the signal from the external network to devices in the home or user network (e.g., external network receiving device 120 and external network receiving device 130) in conjunction with signals that operate in the MoCA network with the home or user network. Moca interface 110 may include active or passive circuit elements that may split or separate the input signal into different or similar output signals. Moca interface 110 may use amplifiiers, frequency filters, and electromagnetic circuits to split or separate the signal. In one embodiment, the external network provides a signal on a co-axial cable between the frequency range of 20 Megahertz (MHz) and 800 MHz. The MoCA network operates using signals in the frequency range from 950 MHz to 1,050 MHz. In an alternative embodiment, the external network provides a signal between the frequency range of 950 MHz and 2,150 MHz with the MoCA network operating in the frequency range of 475 MHz to 625 MHz. MoCA interface 110 provides a signal splitting for signals from the external network and a separate signal splitting for signals on the MoCA network while preventing signals from the MoCA network from being output to the external network.

External network receiving device 120 and external network receiving device 130 may each operate and function in a similar manner. External network receiving device 120 and external network receiving device 130 receive the signal from the external network through the MoCA interface 110. External network receiving device 120 and external network receiving device 130 may receive different types of media content (e.g., different channels) from either the external network or from other devices in the home network through either MoCA interface 110 or local network interface 150. External network receiving devices 120 and 130 tune, demodulate, decode, and process the received content and further provide the content for display and use by a user in the home. External network receiving devices 120 and 130 may further provide a separation of the media content based on instructions provided with the content or over the external network. External network receiving devices 120 and 130 may also process and separate media content based on instructions received via user commands. External network receiving devices 120 and 130 may also provide storage, such as a hard drive or optical disk drive, for recording and/or storing the media content as well as providing the content for playback to other devices in a home network (e.g., MoCA network device 140 and local network device 160). The operation and function of an external network receiving device, such as discussed here, will be described in further detail below. External network receiving devices 120 and 130 may be one of a settop box, home media server, computer media station, home network gateway, multimedia player, game platform, modem, router, home network appliance, or the like.

External network receiving devices 120 and 130 provide interfaces for communicating signals on the MoCA network through MoCA interface 110 to and from other MoCA network devices (e.g., external network receiving devices 120 and 130 and MoCA network device 140). External network receiving devices 120 and 130 also provide interfaces to a local home network through local network interface 150 to local network device 160. In one embodiment, the local network is an Ethernet network. In addition, the local network may be a wireless network. Wireless communication using a wireless network may include physical interfaces to accommodate one or more wireless formats including Wi-Fi, Institute of Electrical and Electronics Engineers standard IEEE 802.11 or other similar wireless communications protocols.

MoCA interface 110 provides MoCA network signals between external network receiving device 120, external network receiving device 130, and MoCA network device 140. MoCA network device 140 tunes, demodulates, and decodes MoCA signals for display and use by a user. MoCA network device 140 may also transmit or communicate signals on the MoCA network for delivery to other devices (e.g., external network receiving device 120 or 130). These signals may provide control or identification information for media content to be delivered to the MoCA network device 140. The MoCA network device 140 is often referred to a thin client MoCA device and may be, but is not limited to, a settop box, setback box, computer device, tablet, display device, television, wireless phone, personal digital assistant (PDA), gaming platform, remote control, multi-media player, or home networking appliance that includes a MoCA interface, and may further include a storage media for digital video recording. MoCA network device 140 may also include a storage device, such as a hard drive or optical disk drive, for recording and playing back audio and video content.

Local network interface 150 provides the routing and signal communication and management functions between devices communicating across the local network. In one embodiment, local network interface 150 operates as a signal router for communicating using internet protocol routing protocols as part of an Ethernet network.

Local network interface 150 provides local network signals between external network receiving device 120, external network receiving device 130, and local network device 160. Local network device 160 also may tune, demodulate, and/or decode the local network signals for display and use by a user depending on the communication protocol used. Local network device 160 may also transmit or communicate signals on the local network for delivery to other devices (e.g., external network receiving device 120 or 130). These signals may provide control or identification information for media content to be delivered to the local network device 160. The local network device 160 is often referred to a thin client device and may be, but is not limited to, a computer device, tablet, display device, television, wireless phone, personal digital assistant (PDA), gaming platform, remote control, multi-media player, or home networking appliance that includes a local network interface. Local network device 160 may further include a storage media for digital media recording.

Media content playback device 170 provides local source playback for one or more formats of media content from an internal or separate media element. Media content playback device 170 may include a compact disc (CD) DVD drive, Blu-Ray drive, a hard disk drive, an electronic memory, or other storage or storage access element. Media content playback device 170 reads the media content from the media element and outputs the media content in one or more audio/video signal formats (e.g., HDMI). The audio/video signals are provided to MoCA network device 140.

Display device 180 receives audio/video signals from the MoCA network device 140 and displays them. The audio/video signal may either be from media content playback device 170 or may be from external network receiving devices 120 and 130 through MoCA interface 110. Display device 180 may be a conventional two-dimensional (2-D) type display or may alternatively be an advanced three-dimensional (3-D) type display.

It is important to note that external network receiving devices 120 and 130 and local network device 160 may include display capability or may be connected to one or more display devices, such as display device 180, not shown. Further, external network receiving devices 120 and 130 and local network device 160 may include interfaces for connecting a media content playback device, such as media content playback device 170, not shown. It should be appreciated that other devices having display capabilities including, but not limited to, computer devices, tablets, gateways, display devices, televisions, wireless phones, PDAs, computers, gaming platforms, remote controls, multi-media players, home networking appliances or the like, may employ the teachings of the present disclosure and are considered within the scope of the present disclosure.

In operation, system 100 provides the networking and communication capability for connecting and sharing media content between devices in a user's home using either the MoCA network, or the local network, or both networks. In one embodiment, media content for a particular program is tuned by external network receiving device 120 and provided to MoCA network device 140 through MoCA interface 110 for viewing on display device 180. In order to provide the received signal from external network receiving device 120 to MoCA network device 140, external network receiving device 120 transmits a MoCA signal. The MoCA signal may be transmitted at the same time external network receiving device 120 is receiving the broadcast signal. In order to prevent degradation of reception of the broadcast signal, external network receiving device 120 may adjust the transmission signal level of the MoCA signal based on the received signal level for the broadcast signal. Further details related to the operation of tracking or controlling the transmission signal level of a home network signal while receiving a broadcast signal in a device will be described below. Other embodiments and uses related to the sharing and distribution of media content in a home network using more than one physical communication network and power consumption management are also possible.

It should be appreciated by one skilled in the art that system 100 in FIG. 1 is described primarily as operating with a local MoCA network and a second local network, such as an Ethernet network. However, other network standards that incorporate either a wired or wireless physical interface may be used. For instance, the second local network may be wireless network using WiFi, Bluetooth, or IEEE 802.11. Other wired networks, such as phone line or power line networks, may be used in place of the Ethernet network. Further, more than two networks may be used either alternatively or simultaneously together.

Figure 2:
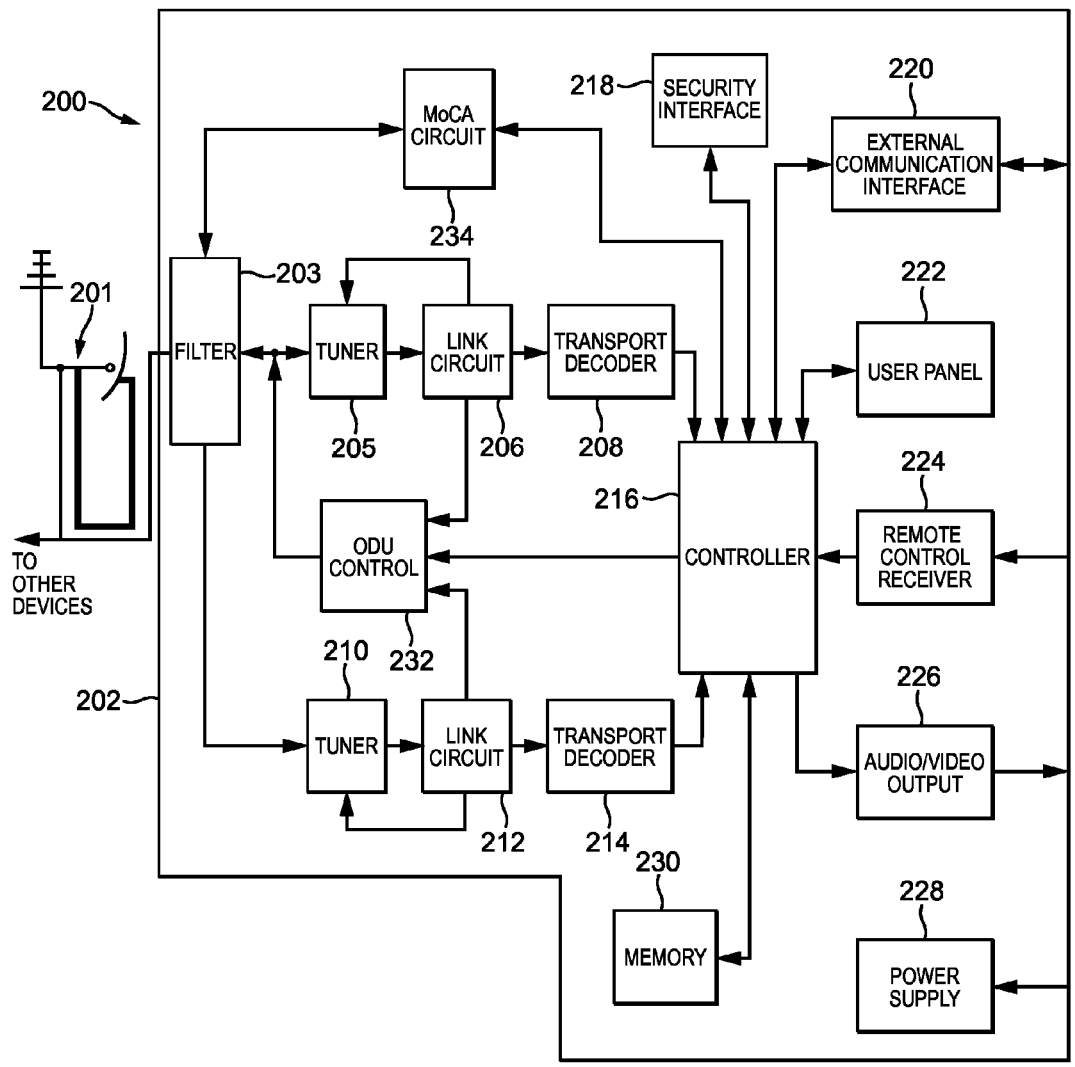
FIG. 2 is a block diagram of an exemplary system for receiving broadcast media content in accordance with the present disclosure.

Turning to FIG. 2, an exemplary embodiment of a system 200 for receiving signals using aspects of the present invention is shown. System 200 primarily receives signals from one or more satellites as well as multiple television broadcast transmission sites. The signals are provided by one or more service providers and represent broadcast audio and video programs and content. System 200 is described as including components that reside both inside and outside a user's premises. It is important to note that one or more components in system 200 may be moved from inside to outside the premises. For example, one or more components in system 200 may operate in a manner similar to external network devices 120 and 130 or MoCA network device 140 described in FIG. 1. Further, one or more components may be integrated with a display device, such as a television or display monitor (not shown). In either case, several components and interconnections necessary for complete operation of system 200 are not shown in the interest of conciseness, as the components not shown are well known to those skilled in the art.

An outdoor unit (ODU) 201 receives signals from satellites and from terrestrial transmission towers through an over the air and/or near earth orbit communications link. ODU 201 is connected to set top box 202. Within set top box 202, the input is connected to filter 203. Filter 203 connects to three signal processing paths. A first path includes tuner 205, link circuit 206, and transport decoder 208 connected together serially. A second path includes tuner 210, link circuit 212, and transport decoder 214 connected together serially. A third path includes MoCA circuit 234 which further connects to controller 216. The outputs of transport decoder 208 and transport decoder 214 each connect to controller 216. Controller 216 connects to security interface 218, external communication interface 220, user panel 222, remote control receiver 224, audio/video output 226, power supply 228, memory 230, and ODU control 232. External communication interface 220, remote control receiver 224, audio/video output 226, and power supply 228 provide external interfaces for the set top box 202. ODU control 232 also connects to the filter 203.

Satellite signal streams, each containing a plurality of channels, are received by ODU 201. ODU 201 includes a dish for capturing and focusing the propagated radio wave from the atmosphere onto one or more antennas contained within a structure known as a low noise block converter (LNB). ODU 201 may be configured to receive the signal streams from satellite transponders located on one or more satellites. In a preferred embodiment, two sets of sixteen channels are received by ODU 201, and converted, using one or more LNBs to a frequency range of either 950 Megahertz (MHz) to 2,150 MHz or 1,250 MHz to 2,150 MHz, referred to as L-band. ODU 201 also includes a terrestrial antenna for receiving over the air broadcasts. In a preferred embodiment, ODU 201 includes a multiple element antenna array for receiving ISDBT signals in the frequency range from 174 MHz to 806 MHz.

ODU 201 provides a converted signal stream to the set top box 202 through radio frequency (RF) co-axial cable. The converted signal stream is provided to filter 203. In a preferred embodiment, filter 203 operates as a multiplex filter with up to three separate filter sections or interfaces. The frequency response properties of filter 203 may include a separate high pass filter and low pass filter such that the frequency passbands of each do not overlap. The arrangement, often referred to as a diplexer or diplex filter, allows for a separation, through signal filtering, of the incoming satellite signal and/or MoCA signal from the terrestrial signal and/or MoCA signal. In a preferred embodiment, the low pass filter frequency response pass band ends at a frequency below either 950 MHz or 1,250 MHz. The low pass filter portion may allow a MoCA signal in a frequency range from 900 MHz to 1,200 MHz as well as a terrestrial signal in the frequency range from 174 MHz to 806 MHz to pass through to subsequent blocks while attenuating, or not passing through, a satellite signal in a frequency range from 950 MHz or 1,250 MHz to 2,150 MHz. The high pass filter portion operates in an opposite manner passing the MoCA signal, in the frequency range around 1,100 MHz, along with the satellite signal through and attenuating cable or terrestrial broadcast signal. The high pass filter portion may also filter any electrical supply or communication signals provided to the ODU 201. An additional band pass filter circuit may be provided to further process MoCA signals and provide the signals as an output to a home MoCA network or for processing in set top box 202. Other embodiments may be possible and some of these embodiments are described in further detail below. Filter 203 may also include surge or transient voltage protection devices.

The output signal from the high pass filter portion of filter 203 is provided to a first signal path containing a tuner 205, a link circuit 206, and a transport decoder 208 connected in a serial fashion. The output signal from the low pass filter portion of the filter 203 is provided to a second signal path. The second signal path also contains a tuner 210, a link circuit 212, and a transport decoder 214 connected in a serial fashion. Each processing path may perform similar processing on the filtered signal streams, the processing being specific to the transmission protocol used.

Tuner 205 processes the split signal stream by selecting or tuning one of the channels provided from a satellite service provider in the high pass filtered signal stream to produce one or more baseband signals. Tuner 205 contains circuits (e.g., amplifiers, filters, mixers, and oscillators) for amplifying, filtering and frequency converting the satellite signal stream. Tuner 205 typically is controlled or adjusted by link circuit 206. Alternately, tuner 205 may be controlled by another controller, such as controller 216, which will be described later. The control commands include commands for changing the frequency of an oscillator used with a mixer in tuner 205 to perform the frequency conversion.

Tuner 210 processes the low pass filtered signal stream by selecting or tuning one of the terrestrial or cable broadcast channels in the split signal stream to produce one or more baseband signals. Tuner 210 contains circuits (e.g., amplifiers, filters, mixers, and oscillators) for amplifying, filtering and frequency converting the signal stream. Tuner 210 may controlled or adjusted in a manner similar to that described earlier for tuner 205.

Typically the baseband signals at the output of tuner 205 or tuner 210 may collectively be referred to as the desired received signal and represent one satellite channel selected out of a group of channels that were received as the input signal stream. Although the signal is described as a baseband signal, this signal may actually be positioned at a frequency that is only near to baseband.

The one or more baseband signals from the satellite service provider are provided to link circuit 206 through tuner 205. Link circuit 206 typically contains the processing circuits needed to convert the one or more baseband signals into a digital signal for demodulation by the remaining circuitry of link circuit 206. In one embodiment the digital signal may represent a digital version of the one or more baseband signals. In another embodiment the digital signal may represent the vector form of the one or more baseband signals. Link circuit 206 also demodulates and performs error correction on the digital signal from the satellite service provider to produce a transport signal. The transport signal may represent a data stream for one program, often referred to as a single program transport streams (SPTS), or it may represent multiple program streams multiplexed together, referred to as a multiple program transport stream (MPTS).

The one or more baseband signals from the broadcast service provider are provided to link circuit 212 through tuner 210. Link circuit 212 typically contains the processing circuits needed to convert the one or more baseband signals into a digital signal for demodulation by the remaining circuitry of link circuit 212 in a manner similar to link circuit 206 described earlier. Link circuit 212 also demodulates, performs broadcast channel equalization error correction on the digital signal from the broadcast service provider to produce a transport signal. As described earlier, the transport signal may represent a data stream for one program or it may represent multiple program streams multiplexed together.

The transport signal from link circuit 206 is provided to transport decoder 208. Transport decoder 208 typically separates the transport signal, which is provided as either a SPTS or MPTS, into individual program streams and control signals. Transport decoder 208 also decodes the program streams, and creates audio and video signals from these decoded program streams. In one embodiment, transport decoder 208 is directed by user inputs or through a controller, such as controller 216, to decode only the one program stream that has been selected by a user and create only one audio and video signal corresponding to this one decoded program stream. In another embodiment, transport decoder 208 may be directed to decode all of the available program streams and then create one more audio and video signals depending on user request.

The transport signal from link circuit 212 is similarly provided to transport decoder 214. Transport decoder 214 decodes the program streams, and creates audio and video signals from these decoded program streams as directed by user inputs or a controller in a manner similar to that described earlier for transport decoder 208.

The audio and video signals, along with any necessary control signals, from both transport decoder 208 and transport decoder 214 are provided to controller 216. Controller 216 manages the routing and interfacing of the audio, video, and control signals and, further, controls various functions within set top box 202. For example, the audio and video signals from transport decoder 208 may be routed through controller 216 to an audio/video (A/V) output 226. A/V output 226 supplies the audio and video signals from set top box 202 for use by external devices (e.g., televisions, display monitors, and computers). Also, the audio and video signals from transport decoder 214 may be routed through controller 216 to memory block 230 for recording and storage.

Memory block 230 may contain several forms of memory including one or more large capacity integrated electronic memories, such as static random access memory (SRAM), dynamic RAM (DRAM), or hard storage media, such as a hard disk drive or an interchangeable optical disk storage system (e.g., compact disk drive or digital video disk drive). Memory block 230 may include a memory section for storage of instructions and data used by controller 216 as well as a memory section for audio and video signal storage. Controller 216 may also allow storage of signals in memory block 230 in an alternate form (e.g., an MPTS or SPTS from transport decoder 208 or transport decoder 214).

Controller 216 is also connected to an external communications interface 220. External communication interface 220 may provide signals for establishing billing and use of the service provider content. External communications interface 220 may include a phone modem for providing phone connection to a service provider. External communications interface 220 may also include an interface for connection to an Ethernet network and/or to home wireless communications network. The Ethernet network and/or home wireless network may be used for communication data, audio, and/or video signals and content to and from other devices connected to the Ethernet network and/or home wireless network (e.g., other media devices in a home).

Controller 216 also connects to a security interface 218 for communicating signals that manage and authorize use of the audio/video signals and for preventing unauthorized use. Security interface 218 may include a removable security device, such as a smart card. User control is accomplished through user panel 222, for providing a direct input of user commands to control the set top box and remote control receiver 224, for receiving commands from an external remote control device. Although not shown, controller 216 may also connect to the tuners 205, 210, link circuits 206, 212, and transport decoders 208, 214 to provide initialization and set-up information in addition to passing control information between the blocks. Finally, power supply 228 typically connects to all of the blocks in set top box 202 and supplies the power to those blocks as well as providing power to any of the elements needing power externally, such as the ODU 201.

Controller 216 also controls ODU control 232. ODU control 232 provides signaling and power supply electrical power back to the ODU 201 through filter 203. ODU control 232 provides these signals and power onto the co-axial cable(s) running between ODU 201 and set top box 202. In one embodiment, the ODU control 232 receives input control signals from controller 216 and provides different DC voltage levels to specific portions of the ODU 201 to provide a certain signal stream containing a set of programs or content to filter 203 and further to tuner 205 and tuner 210. In another embodiment, the ODU control 232 receives inputs from controller 216 and also from link circuit 206 and link circuit 212 and provides DC voltage levels and a separate tuning control signal to ODU 201 using low frequency carrier based frequency shift keying modulation. Controller 216 also may send control commands to disable ODU controller 230 from providing either direct current (DC) voltages or control signals to ODU 201.

MoCA circuit 234 amplifies and processes the MoCA signal both for reception and transmission. As described above the MoCA interface permits communications of audio and video signals in a home network and may operate bi-directionally. MoCA circuit 234 includes a low noise amplifier for improving reception performance of a MoCA signal received by signal receiving device 200 from another network connected device. The received and amplified signal is tuned, demodulated, and decoded. The decoded signal may be provided to a number of other circuits, including audio and video outputs as well as a mass storage device (e.g., hard disk drive, optical drive, and the like), not shown. Additionally, MoCA circuit 234 generates and formats the MoCA transmit signal using audio and video content available in signal receiving device, including content received from the input (e.g., satellite signal) and content from the mass storage device. MoCA circuit 234 also includes a power amplifier for increasing the transmitted signal level of the MoCA signal sent by signal receiving device 200 to another network connected device.

Adjustment of the receive signal amplification, in filter 203, tuner 205, and tuner 210, as well as the transmit signal amplification in MoCA circuit 234 may be controlled by controller 216. Controller 216 may control the level of the transmitted signal from MoCA circuit 234 based on the received signal level in tuner 205 and/or tuner 210 in order to prevent performance degradation. Controller 216 may determine transmission signal level limits using information about changes in attenuator settings in filter 203, tuner 205, and/or tuner 210. These transmission signal level limits may be stored in memory 230. The determination may be performed as part of a calibration procedure and may be performed during production or during initial device set-up.

It should be appreciated by one skilled in the art that the blocks described inside set top box 202 have important interrelations, and some blocks may be combined and/or rearranged and still provide the same basic overall functionality. For example, transport decoder 208 and transport decoder 214 may be combined and further integrated along with some or all of the functions of controller 216 into a System on a Chip (SoC) that operates as the main controller for set top box 202. Further, control of various functions may be distributed or allocated based on specific design applications and requirements. As an example, link circuit 206 may provide all control signals to ODU control 232 while no connection may exist between link circuit 212 and ODU control 232.

Further, it should be appreciated that although ODU 201 includes both a dish and LNB for use with satellite signals and a terrestrial antenna, other embodiments may use separate structures. In some embodiments, the satellite dish and LNB and included in one structure and the terrestrial antenna is part of a second structure. The outputs of both satellite dish/LNB structure and terrestrial antenna are combined using a signal combining circuit and provided to set top box 202.

Although set top box 202 is described above as receiving a single converted signal stream, set top box 202 may also be configured to receive two or more separate converted signal streams supplied by ODU 201 in some modes of operation. Operation in these modes may include additional components including switches and/or further tuning and signal receiving components, not shown. Set top box 202 may also be modified to receive, tune, and demodulate two satellite signals simultaneously. Tuners 205 and 210, demodulators 206 and 212, and transport decoders 208 and 214 may be identical or similarly configured to receive satellites signals. Further, set top box 202 may be designed to operate only on a home network using the Ethernet or home wireless network interfaces described above. In this case, the elements associated with receiving a broadcast signal may be removed from set top box 202.

Figure 3:
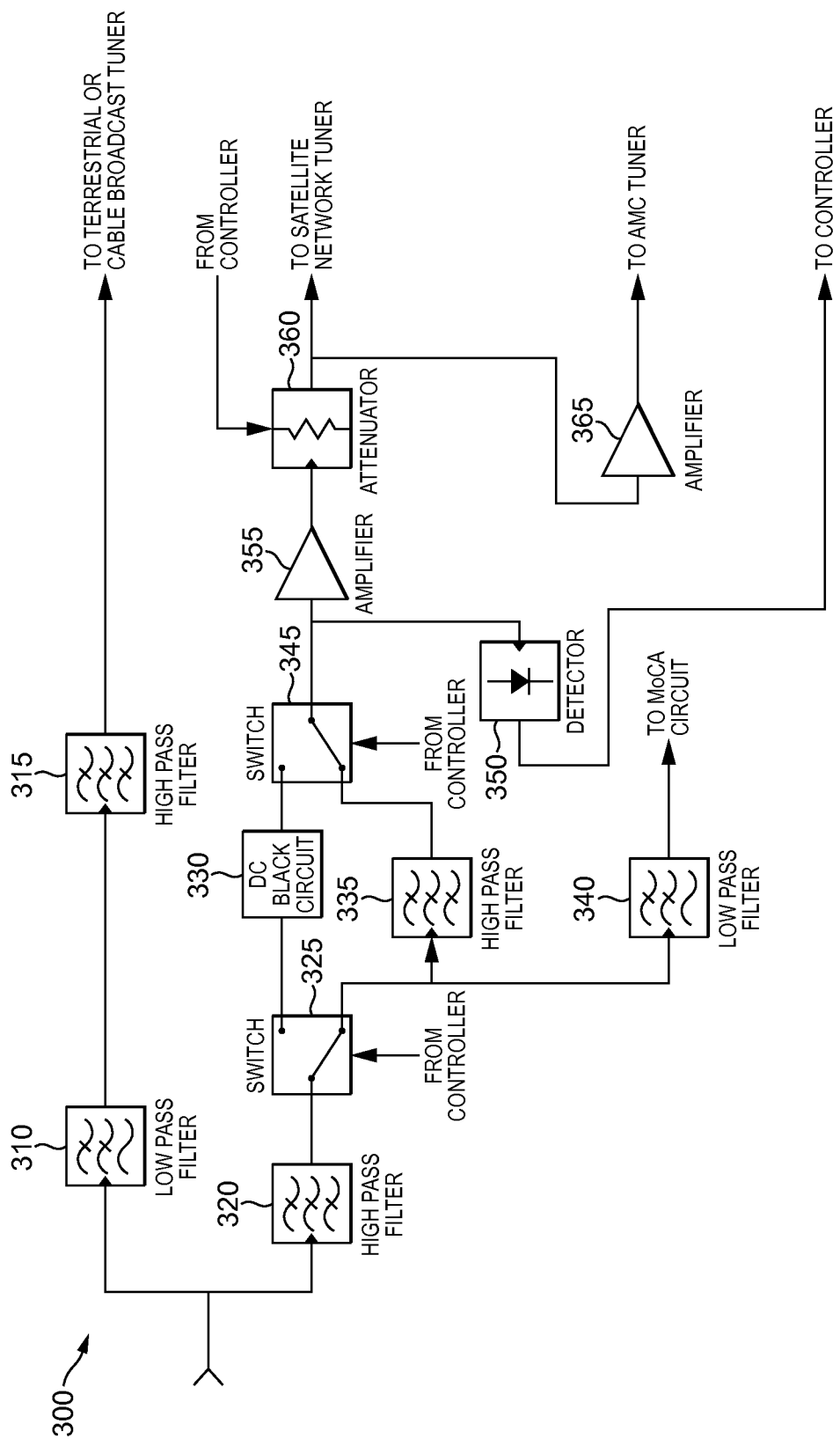
FIG. 3 is a block diagram of an exemplary signal receiving and filtering circuit used in a system for receiving broadcast media content in accordance with the present disclosure.

Turning to FIG. 3, a block diagram of a signal receiving and filtering circuit 300 used in a system for receiving broadcast media content in accordance with the present disclosure is shown. Circuit 300 includes one input and provides multiple outputs or interfaces for broadcast satellite and MoCA signals. The operation of the signal processing element for each of the outputs produce separate output signals that operate in different frequency ranges. Circuit 300 may further operate in a manner similar to filter 203 described in FIG. 2. Circuit 300 may be included in a set top box or other signal receiving device, such as set top box 202 described in FIG. 2 or external network receiving device 120 or 130 described in FIG. 1.

Circuit 300 includes low pass filter 310 and high pass filter 320 connected to an input. The output of low pass filter 310 is provided to high pass filter 315. The output of high pass filter 315 is provided other circuits for receiving broadcast signals. The output of high pass filter 320 is connected to switch 325. One output of switch 325 is connected to DC block circuit 330. The other output of switch 325 is connected to both high pass filter 335 and low pass filter 340. The output of low pass filter 340 is connected to a MoCA transmit/receive circuit, such as MoCA circuit 234 described in FIG. 2. The output of DC block circuit 330 is connected to one input of switch 345. The output of high pass filter 345 is connected to a second input of switch 345. The output of switch 345 is connected to both detector 350 and amplifier 355. The output of detector 350 is provided to a controller, such as controller 216 described in FIG. 2. The output of amplifier 335 is connected to attenuator 360. The output of attenuator 360 is provided to a network tuner, such as tuner 205 described in FIG. 2. The output of attenuator 360 is also connected to amplifier 365. The output of amplifier 365 is provided to an advanced modulation and coding (AMC) tuner, such as tuner 210 described in FIG. 2.

The received signal at the input to circuit 300 may include satellite and terrestrial or cable broadcast signals along with transmitted and received signals operating in a home network, such as a MoCA network. High pass filter 320 passes satellite signals with frequencies above 950 MHz for satellite signal processing and also passes home network signals above 950 MHz when present. High pass filter 320 rejects or attenuates the terrestrial or cable broadcast signals and prevents these signals from appearing at the first output. The terrestrial or cable broadcast signals are filtered and passed through the series structure of low pass filter 310 and high pass filter 315. Satellite signals, along with MoCA signals, are rejected or attenuated, preventing these signals from appearing at the output for the terrestrial or cable broadcast tuner. In one embodiment, the series structure forms a band pass filter comprised of a high pass filter with a cut off frequency of 170 MHz and low pass filter with a cut off frequency of 806 MHz.

Two modes of operation may exist for receiving satellite signals and operating in a home network using circuit 300. In one embodiment, switch 325 and switch 345 are single pole double throw type switches to facilitate the two modes. Switch 325 and switch 345 are preferably electrically controlled by a control circuit (e.g., controller 216 in FIG. 2) and may use a mechanical or electrical switching element. In a first mode, only satellite signals may be present at the input. The switch position of both switch 325 and switch 345 is oriented so that the signal at the input to switch 325 is routed through DC block circuit 330 and to the output of switch 345. DC block circuit 330 may include a capacitor to prevent DC current from passing through but allow the satellite signals to pass through. In a second mode, both satellite signals and home network signals may be present. In the second mode, the switch positions in switches 325 and 345 are oriented so that the signal in the satellite signal frequency range is routed through high pass filter 335. In one embodiment, high pass filter 335 is a high pass filter with a cutoff frequency of 1,250 MHz. Also, in the second mode, the signal in the home network (e.g., MoCA) signal frequency range is routed through low pass filter 340. The home network signal is a bi-directional signal being received as well as transmitted by the device (e.g., set top box 202 described in FIG. 2). In one embodiment, low pass filter 340 is a low pass filter with a cutoff frequency of 1,050 MHz. Circuit 300 may also include a connection into one or of the blocks at the input (e.g., low pass filter 310 and high pass filter 320) for electrical power and communication to external circuits (e.g., an outdoor receiving unit for the satellite signals), not shown.

It is important to note that each of the filters described above, in one embodiment, are implemented as Elliptical type filters having multiple different filter orders. It is to be understood that alternate type filters and different filter orders may be used for one or more of the filters in consideration of specific tradeoffs within the design constraints.

The satellite frequency range portion of the signal, either in mode 1 or mode 2, is provided to detector 350. Detector 350 may be a wide band detector that receives and processes the entire frequency range to determine a power level for the signal. Typically, the input power level for a satellite signal is between −69 decibels relative to one milliwatt (dBm) and −20 dBm per transponder with between 4 and 32 transponders present in the signal at the same time. The output of detector 350 is provided to a controller (e.g., controller 216 described in FIG. 2) and used to establish and set, among other things, the amplitude level setting for the signal. The amplitude or signal level for the signal is adjusted, at least in part through a gain or attenuation adjustment using a control signal from the controller to attenuator 360. The satellite signal is also provided to amplifier 355. The amplifier 355 amplifies the signal and provides the amplified signal to attenuator 360. The combination of amplifier 355 and attenuator 360 operate as a gain or attenuation control stage. In a preferred embodiment, attenuator 360 is a 4 level stepped attenuator having fixed signal attenuation level settings of 0 decibels (dB), 10 dB, 25 dB, and 35 dB and the signal gain of amplifier 355 is 10 dB. In other embodiments, other attenuator configurations and levels may be used. In some embodiments, attenuator 360 may be eliminated and a variable gain amplifier used for amplifier 355. As described earlier, the controller provides a control signal to attenuator 360 to change the attenuator level settings based on the value received from detector 350.

The output of attenuator 360 is provided to a first satellite tuner, identified as a network tuner. The output of attenuator 360 is also provided to amplifier 365. Amplifier 365 amplifies the signal and provides the signal to a second satellite tuner, identified as an AMC tuner. In a preferred embodiment, the gain of amplifier 365 is 13 dB. Both the network tuner and AMC tuner are similar in operation to tuner 205 or tuner 210 and link circuit 206 or link circuit 211 described in FIG. 2. The network tuner operates to primarily receive program guide information while the AMC tuner operates primarily to receive the media or data signals.

As described earlier, insufficient frequency spacing between the MoCA signal frequency range and the satellite signal frequency range may not allow suitable filtering for attenuating the transmitted MoCA signal in the signal path for the received satellite signal. As a result, the transmitted MoCA signal is present at the input of detector 350 and affects the value for the detected signal. The effect may be more pronounced at lower signal input levels for the satellite signal. The additional signal energy affecting the detector value causes incorrect gain setting for the satellite signal level and degraded satellite signal reception. Further, even if the gain setting is maintained at a correct gain setting for the received signal, the additional signal energy from the transmitted MoCA signal may cause distortion in the amplifier circuits, including signal compression and the generation of signal harmonic energy interfering with reception performance. It may be possible that additional filtering may be used. However, the additional filtering has its own drawbacks including reducing the performance level of the satellite signal due to increased insertion loss or signal attenuation in the filters as well as increased cost.

Additionally, the filter performance is limited not just by the filter but also by the performance of the switches (e.g., switch 325 and switch 345) that may provide a separate signal path around the filter (e.g., high pass filters 335) due to signal leakage. The problem is further aggravated by unit to unit variations in operations and circuit performance. These variations may include, but are not limited to, transmission power level from the MoCA circuit (e.g., MoCA circuit 234 described in FIG. 2), filter rejection of the filters (e.g., low pass filter 340 and high pass filter 335) between the MoCA circuit and the power detector (e.g. detector 350), and power detector sensitivity. These variations cause additional difficulty in setting a proper static threshold for the correct satellite signal gain or attenuation setting, particularly in the presence of a MoCA transmission signal. Further, the gain control step range at low signal level may be very coarse (e.g., 5-10 dB per step in attenuator 360). As a result, a slightly higher or slower (e.g., 1-2 dB) adjustment for the setting in the attenuator in order to compensate for the presence of the MoCA transmission signal is not possible.

As a specific example, the lowest satellite signal level for composite receive satellite signal at the input of the signal receiver (e.g., set top box 202) at which full performance operation can be achieved is approximately −69 dBm. Signal levels may be higher. In order to maintain proper performance in the signal receiver, the setting in the attenuator (e.g., attenuator 360) is set to its low signal level input attenuator setting (e.g., 0 dB attenuation) for signal levels up to approximately −48 dBm. At input levels above −48 dBm, a second attenuator setting (e.g., 10 dB attenuation) may be used.

For the MoCA transmission, the maximum transmission level is +7 dBm. After attenuation of the MoCA signal in the filters (e.g., high pass filter 335 and low pass filter 340), the expected signal level measured at the power detector (e.g., detector 350) may still be −40 dBm. The addition of the transmission signal from the home network or MoCA transmission causes the detector to read a signal level greater than −48 dBm (i.e., approximately −40 dBm). The detector provides this value to the controller (e.g. controller 216 in FIG. 2) and the controller sends a signal to the attenuator (e.g., attenuator 360) to switch to the second attenuator level setting (e.g., 10 dB attenuation setting). The use of the second attenuator level setting does not adversely affect satellite signal reception performance for input satellite signal levels greater than −59 dBm. However, the use of the second attenuator setting degrades the reception performance when the input signal level is below −59 dBm and potentially prevents signal reception at all for the lowest input level of −69 dBm.

In order to overcome this problem, the power level for the MoCA transmission signal may be tracked with respect to the input signal level for the received satellite signal. In one embodiment, the tracking process determines a maximum allowable transmission level for the low level received satellite signal level. The process may be performed either in initial production or in initial product startup. The transmission level for the MoCA transmission signal is adjusted in the absence of an input satellite signal. The gain or attenuator control setting value is initially set to a first setting value, preferably the setting for the minimum input signal level. The controller determines if a setting value change is necessary based on the transmission level for the MoCA transmission signal and the resulting signal level measured at the detector.

The transmission level for the MoCA transmission signal may be set intentionally low in signal level and may be increased until the gain or attenuator setting value changes (e.g., switches to the next setting) from its initial setting. Alternatively, the transmission level may be set intentionally high (e.g., maximum transmission level) and reduced until the gain or attenuator setting value would not be changed from its initial setting. The detector provides a signal representative of the received level to the controller. The controller determines whether a different attenuator setting should be used and, based on this determination, the transmission level may be incremented or decremented by a fixed amount (e.g., 1 dB). The operation continues until a maximum allowable transmission level is determined. The maximum allowable transmission level is stored for that particular gain or attenuator setting. Prior to a further transmission, the controller determines the current gain or attenuator setting for the received broadcast signal and retrieves the maximum allowable transmission level. The controller does not allow transmission of a network or MoCA signal to exceed the maximum level while the broadcast signal is being received.

In another embodiment, a self-calibration process may be performed for tracking the transmission level of the MoCA transmission signal relative to the received satellite signal. The process may be performed by setting up the switches (e.g., switch 325 and switch 345) to route the MoCA circuit transmission signal to the detector (e.g., detector 350) through the filters (e.g., high pass filter 335 and low pass filter 340) and effectively disconnect the incoming satellite signal. The self-calibration process effectively internally creates the operating condition with no input signal described earlier.

The maximum value for the network or MoCA signal transmission level based on tracking the input signal may also be determined when a broadcast signal is being received. In one embodiment, the lowest signal level for satellite broadcast signal may be provided. The satellite broadcast signal is routed to the detector in operating mode 2 described earlier. The procedure described earlier, to adjust the MoCA signal transmission level until the attenuator setting changes, may be used to determine the maximum signal transmission level value.

Referring back to the specific example described earlier, a satellite signal having a signal level equal to −48 dBm is input to the receiving device (e.g., set top box 202 described in FIG. 2) with the attenuator (e.g., attenuator 360) set at its lowest value (e.g., 0 dB). The MoCA transmission level is started at a low level equal to −25 dBm. The controller (e.g., controller 216 in FIG. 2) determines if the attenuator setting level for the attenuator should be changed based on the value received from the detector (e.g., detector 350). The controller increases the transmission level for the MoCA signal in the MoCA circuit (e.g., MoCA circuit 234 in FIG. 2) until the attenuator control setting value should be change from its lowest setting value to its second setting value (e.g., from 0 dB to 10 dB attenuation). The transmission level value at this point is recorded and stored in memory (e.g., memory 230 described in FIG. 2). In this manner, the maximum transmission level for the MoCA signal to be used for a satellite signal at received signal levels of −48 dBm and lower is identified. The controller may use the stored maximum transmission level as part of a tracking condition for signal transmission depending on the received satellite signal level based on the attenuator setting prior to permitting transmission of the MoCA signal.

The operations described in one or more of the above embodiments may be repeated using other satellite inputs signal levels and/or other gain control settings. In this manner, the maximum MoCA transmission signal level settings may be tracked to any received signal level for the input satellite signal and/or to the various attenuator level settings used with the satellite signal.

Figure 4:
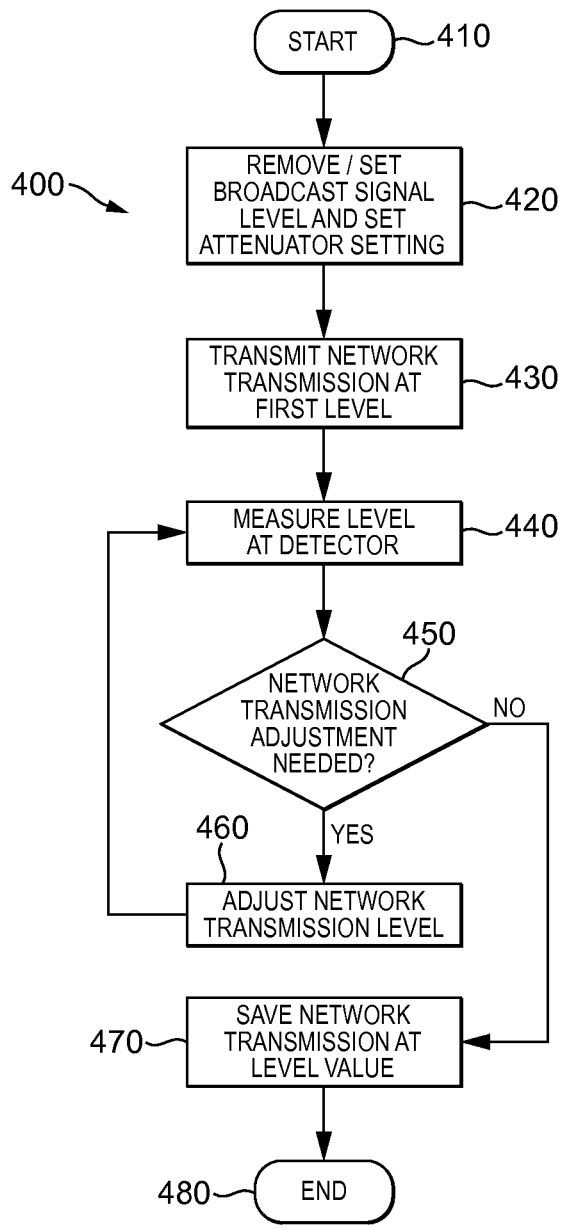
FIG. 4 is a flowchart of an exemplary process for tracking a home networking transmission signal in a broadcast signal receiving device in accordance with the present disclosure.

Turning now to FIG. 4, a flowchart of a process for tracking a home networking transmission signal in a broadcast signal receiving device in accordance with the present disclosure is shown. Process 400 will primarily be described with respect to circuit 300 described in FIG. 3. The steps of process 400 may equally apply to filter 203 used in set top box 202 described in FIG. 3. Additionally, one or more of the steps in process 400 may be used in a receiving device, such as external network receiving device 120 and 130 described in FIG. 1. Further, it is important to note that some of the steps described in process 400 may be implemented more than once, may be implemented recursively, or may be omitted. Such modifications may be made without any effect to the overall aspects of process 400.

The process 400 starts, at step 410, either during initial manufacturing or at initial startup or power on of the device (e.g., set top box 202). Process 400, may also be initiated, at step 410, by a user input on a user interface (e.g., user panel 222). At step 420, an initial setting condition for the reception of a broadcast signal is established. The configuration may include operation without inputting a broadcast signal, such as operation with the input for the device being disconnected. In one embodiment, the input may be disconnected, at step 420, by setting the switch 325 to connect the input from high pass filter 320 to DC Block circuit 330. Switch 345 is set to connect the output of high pass filter 335 to amplifier 355 and detector 350. In this manner, no received satellite signal may be input to the detector but the transmitted signal from the MoCA circuit 234, after filtering, is routed to the detector 350. The signal transmitted from the MoCA circuit 234 further will not be output from the device.

Also, at step 420, an initial signal level value setting is configured. The signal level value setting may be a gain setting in an amplifier circuit or an attenuator setting in an attenuator circuit. Typically, the initial signal level value setting is the setting used for low input signal levels, but in some embodiments, such as if the process is iterated for more than one setting, other settings may be used. In one embodiment, the controller 216 provides a signal that sets attenuator 360 to its lowest attenuation (e.g., 0 dB) setting value.

At step 430, the network transmission signal level is set to a first level. In one embodiment, at step 430, the MoCA circuit (e.g., MoCA circuit 234) transmit signal is set, by controller 216, into transmission mode at a first transmission level that is at a maximum signal level (e.g., +7 dBm).

At step 440, the signal level for the network transmission signal is measured in a detector in the device. As described at step 420, the configuration for the device allows the network transmission signal to be present at the signal detector in the receiver circuit portion of the device. In one embodiment, at step 440, the MoCA circuit transmit signal, after passing through low pass filter 340, high pass filter 335 and switch 345, is detected in detector 350. A detected signal level value, representing the signal level present in detector 350 from the MoCA circuit transmit signal, is provided to controller 216.

Next, at step 450, a determination is made as to whether the signal level measured or detected, at step 440, indicates that an adjustment of the transmitted signal level for the network transmission signal is required. In one embodiment, the value representing the detected signal level provided from detector 360 to controller 216 is compared to a predetermined threshold level to determine if the signal level would require a different gain or attenuator setting.

If, at step 450, the transmitted signal level for the network transmission signal would be changed based on the measured level at the detector, then, at step 460, the signal level for the network transmission signal is adjusted from its first or initial level. In one embodiment, if controller 216 determines, based on the value received from detector 350, that the attenuator level setting in attenuator 360 should be changed, then the controller sends a signal to MoCA circuit 234 to reduce the transmission level by 1 dB (e.g., from +7 dBm to +6 dBm). After step 460, the process returns to step 440 to measure the level at the detector with the network transmission signal level. It is important to note that process steps 440, 450, 460 may iterate multiple times.

If, at step 450, the transmitted signal level for the network transmission signal would not be changed based on the measured level at the detector, then, at step 470, an acceptable transmission level for the network transmission signal has been achieved for the current gain or attenuator setting. The current transmission level value is stored in a memory.

The transmission level that is saved, at step 470, may further be adjusted by a predetermined value to account, for instance, for the absence of a received satellite broadcast signal. In a preferred embodiment, the predetermined value is 1 dB. Finally, at step 480, the process ends.

Certain steps in process 400 may be changed or removed in order to facilitate different embodiments. For example, the determination, at step 450, as to whether the signal level for the network transmission should be adjusted may be based on whether the controller 216 determines, based on the value received from detector 350, that the attenuator level setting in attenuator 360 should be not be changed. In one embodiment, the initial transmission level for network signal, at step 430, may be set to a low signal level (e.g., −25 dBm). Steps 450, 460, and 470 may be modified such that if it is determined that no attenuator setting change is needed, then, at step 460, the transmission level for the network transmission signal is increased. Process steps 440, 450, and 460 are repeated until an attenuator setting change is determined, at step 450. The previous transmission level for the network transmission signal before the level at which the attenuator setting change occurs is stored, at step 470.

In another embodiment, step 420 may be modified to include configuring the circuit to provide a broadcast signal at a fixed or predetermined level to the signal detector circuit (e.g., detector 360). Step 440 may further be modified to allow measuring or detecting a signal level at the detector both with and without the presence of the network transmission signal. The circuit may be configured to provide only the broadcast signal to the detector (e.g., through DC block circuit 330 and switches 325 and 345 operating in mode 1 described earlier). The circuit may then be configured to provide both the broadcast signal and the network transmission signal simultaneously to the detector (e.g., through high pass filter 335 and switches 325 and 345 operating in mode 2 described earlier).

In yet another embodiment, a determination of the offset value for the stored transmission level due to the presence of the broadcast signal along with the network transmission signal at the detector may be determined. At step 440, the level at the detector is measured first with the broadcast signal removed or not present using the configuring described earlier, at step 420. The level at the detector is then measured again with the broadcast signal included and provided to the detector by setting switch 325 to route the broadcast signal to high pass filter 335 (i.e., mode 2 described earlier.)

Additionally, the entire process 400 may be iterative to allow determination of multiple maximum transmission level values. In this manner, process 400 may determine and store maximum transmission level values for multiple gain or attenuator settings.

The embodiments described herein are related to controlling or tracking the transmission level of a home network signal in a broadcast signal receiving device. The embodiments describe a method and apparatus that include a detector and controller that adjust a stepped gain attenuator as part of an automatic gain control circuit in the receiving circuit of the device. The signal level for the home network transmission signal from the device is controlled or tracked based on the received signal level, identified based on the attenuator setting, in order to mitigate or prevent undesirable interference to the received signal from the network transmission signal.

Although embodiments which incorporate the teachings of the present disclosure have been shown and described in detail herein, those skilled in the art can readily devise many other varied embodiments that still incorporate these teachings. Having described preferred embodiments of a method and apparatus for tracking a signal level of a home network transmission signal in a broadcast signal receiving device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
   transmitting a signal at a first transmitted signal level, the signal used for communicating in a home network;
   detecting a signal level for the transmitted signal in a circuit, the circuit used for receiving a broadcast signal;
   determining if a signal level setting value in the circuit changes based on the detected signal level;
   reducing the transmitted signal to a level below the first transmitted signal level if it is determined that the signal level setting value changes; and
   storing a current value for the transmitted signal level if it is determined that the signal level setting value does not change.

2. The method of claim 1, wherein the signal level setting value is used for a minimum input signal level for the received broadcast signal.

3. The method of claim 1, wherein the method is performed in a signal receiver that receives satellite broadcast signals in a first frequency range and operates in a home network using signals in a second frequency range.

4. The method of claim 3, wherein the first frequency range is 1250 megahertz to 2150 megahertz and the second frequency range is 950 megahertz to 1050 megahertz.

5. The method of claim 1, wherein the stored transmitted signal level is adjusted by an adjustment factor.

6. The method of claim 5, wherein the adjustment factor accounts for a difference between the received broadcast signal not being present and the received broadcast being present.

7. The method of claim 1, further comprising:
   receiving a broadcast signal; and
   detecting a signal level for the broadcast signal in the circuit.

8. The method of claim 7, further comprising disabling the transmission of the signal at the first transmitted signal level.

9. The method of claim 8, wherein the step of detecting the signal level for the transmitted signal includes detecting the signal level for the received broadcast signal.

10. An apparatus, comprising:
    a network circuit that transmits a signal at a first transmitted signal level, the signal used for communicating in a home network;
    a detector, coupled to the network circuit, that detects the transmitted signal, the detector used in a circuit for receiving a broadcast signal;
    a controller, coupled to the detector and the network circuit, that determines if a signal level setting value in the circuit changes based on the detected signal level and reduces the transmitted signal to a level below the first transmitted signal level if it is determined that the signal level setting value changes; and
    a memory, coupled to the controller, the memory storing a current value for the transmitted signal level if it is determined that the gain setting value detected in the circuit does not change.

11. The apparatus of claim 10, wherein the signal level setting value is used for a minimum input signal level for the received broadcast signal.

12. The apparatus of claim 10, wherein the apparatus is a signal receiver that receives satellite broadcast signals in a first frequency range and operates in a home network using signals in a second frequency range.

13. The apparatus of claim 12, wherein the first frequency range is 1250 megahertz to 2150 megahertz and the second frequency range is 950 megahertz to 1050 megahertz.

14. The apparatus of claim 10, wherein the stored transmitted signal level is adjusted by an adjustment factor.

15. The method of claim 14, wherein the adjustment factor accounts for a difference between the received broadcast signal not being present and the received broadcast being present.

16. The apparatus of claim 10, further comprising a receiver that receives a broadcast signal and wherein the detector detects the signal level for the transmitted signal and the signal level for the received broadcast signal to determine a signal level with the broadcast signal and transmitted signal present.

17. The apparatus of claim 16, wherein the controller disables the transmitter circuit from transmitting the signal at the first transmitted signal level.

18. The apparatus of claim 17 wherein the detector detects a signal level for the broadcast signal when the controller disables the transmitter circuit to determine a signal level with broadcast signal present and the transmitter signal not present.

19. A method comprising:
transmitting a signal at a first transmitted signal level, the signal used for communicating in a home network;
detecting a signal level for the transmitted signal in a circuit, the circuit used for receiving a broadcast signal;
determining if a signal level setting value in the circuit changes based on the detected signal level;
increasing the transmitted signal to a level higher than the first transmitted signal level if the signal level setting value does not change; and
storing a previous transmitted signal level for the transmitted signal if the signal level setting value changes.

20. The method of claim 19, wherein the stored transmitted signal level is adjusted by an adjustment factor.

21. The method of claim 20, wherein the adjustment factor accounts for a difference between the received broadcast signal not being present and the received broadcast being present.

22. An apparatus, comprising:
a network circuit that transmits a signal at a first transmitted signal level, the signal used for communicating in a home network;
a detector, coupled to the network circuit, that detects the transmitted signal, the detector used in a circuit for receiving a broadcast signal;
a controller, coupled to the detector and the network circuit, that determines if a signal level setting value in the circuit changes based on the detected signal level and increases the transmitted signal to a level higher than the first transmitted signal level if it is determined that the signal level setting value does not change; and
a memory, coupled to the controller, the memory storing a previous transmitted signal level for the transmitted signal if it is determined that the gain setting value detected in the circuit changes.

23. The apparatus of claim 22, wherein the stored transmitted signal level is adjusted by an adjustment factor.

24. The method of claim 23, wherein the adjustment factor accounts for a difference between the received broadcast signal not being present and the received broadcast being present.

25. A method comprising:
transmitting a signal at a first transmitted signal level, the signal used for communicating in a home network;
detecting a signal level for the transmitted signal in a circuit, the circuit used for receiving a broadcast signal;
determining if a signal level setting value in the circuit changes based on the detected signal level;
reducing the transmitted signal level of the first transmitted signal level if it is determined that the signal level setting value changes; and
subsequently only transmitting the signal at the first transmitted signal level or at a signal level less than the first transmitted signal level if it is determined that the gain setting value detected in the circuit does not change.

26. An apparatus, comprising:
a network circuit that transmits a signal at a first transmitted signal level, the signal used for communicating in a home network;
a detector, coupled to the network circuit, that detects the transmitted signal, the detector used in a circuit for receiving a broadcast signal;
a controller, coupled to the detector and the network circuit, that determines if a signal level setting value in the circuit changes based on the detected signal level and reduces the transmitted signal level if it is determined that the signal level setting value changes;
wherein the network circuit subsequently only transmits the signal at the first transmitted signal level or at a signal level less than the first transmitted signal level if it is determined that the gain setting value detected in the circuit does not change.

27. A method comprising:
transmitting a signal at a first transmitted signal level, the signal used for communicating in a home network;
detecting a signal level for the transmitted signal in a circuit, the circuit used for receiving a broadcast signal;
determining if a signal level setting value in the circuit changes based on the detected signal level;
increasing the transmitted signal level if the signal level setting value does not change; and
transmitting the signal at a previous level lower than the first transmitted signal level if the signal level setting value changes.

28. An apparatus, comprising:
a network circuit that transmits a signal at a first transmitted signal level, the signal used for communicating in a home network;
a detector, coupled to the network circuit, that detects the transmitted signal, the detector used in a circuit for receiving a broadcast signal;
a controller, coupled to the detector and the network circuit, that determines if a signal level setting value in the circuit changes based on the detected signal level and increases the transmitted signal level if it is determined that the signal level setting value does not change;
wherein the network circuit transmits the signal at a previous level lower than the first transmitted signal level if it is determined that the gain setting value detected in the circuit changes.

* * * * *